United States Patent
Wittkopp et al.

(10) Patent No.: US 7,992,695 B2
(45) Date of Patent: Aug. 9, 2011

(54) ROTARY-TYPE SELECTABLE ONE-WAY CLUTCH

(75) Inventors: Scott H. Wittkopp, Ypsilanti, MI (US); James B. Borgerson, Clarkston, MI (US); Donald L. Dusenberry, Farmington Hills, MI (US); James M. Hart, Belleville, MI (US); Farzad Samie, Franklin, MI (US); Alexander Millerman, Bloomfield Hills, MI (US); Chunhao J. Lee, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 422 days.

(21) Appl. No.: 12/329,864

(22) Filed: Dec. 8, 2008

(65) Prior Publication Data

US 2010/0140041 A1    Jun. 10, 2010

(51) Int. Cl.
    *F16D 13/04* (2006.01)
(52) U.S. Cl. ..................... 192/47; 192/41 R
(58) Field of Classification Search ............ 192/41 R, 192/45, 45.1, 46, 47
    See application file for complete search history.

(56) References Cited

U.S. PATENT DOCUMENTS

| | | | |
|---|---|---|---|
| 6,290,044 B1 * | 9/2001 | Burgman et al. | 192/46 |
| 7,258,214 B2 * | 8/2007 | Pawley et al. | 192/43.1 |
| 7,344,010 B2 * | 3/2008 | Fetting et al. | 192/43.1 |
| 7,766,790 B2 * | 8/2010 | Stevenson et al. | 477/8 |
| 2009/0194381 A1 * | 8/2009 | Samie et al. | 192/43.2 |
| 2009/0266667 A1 * | 10/2009 | Samie et al. | 192/43.1 |

* cited by examiner

*Primary Examiner* — Justin Holmes
(74) *Attorney, Agent, or Firm* — Quinn Law Group, PLLC

(57) ABSTRACT

A selectable one-way clutch (SOWC) assembly uses hydraulic-actuation to select operating modes within a rotating housing. Two races of the SOWC assembly can rotate at disparate speeds, i.e., one race is not grounded prior to actuation. The SOWC assembly has a pair of races keyed to different housings and hubs. The housing and hub can be attached to different elements of a gear train, for example, which can be rotating during the various gear states. A hydraulic actuator or multiple actuators can be keyed to the housing, with axial motion of the actuator or actuators selecting a state or operating mode of the SOWC assembly. The actuator has axially-extending tabs that engage radially-extending fingers of the selector plate, thus rotating the selector plate in different directions when applied or released. Multiple actuators can be used in conjunction with multiple selector plates to provide additional SOWC operating modes.

16 Claims, 3 Drawing Sheets

US 7,992,695 B2

ROTARY-TYPE SELECTABLE ONE-WAY CLUTCH

TECHNICAL FIELD

The present invention relates generally to an automotive powertrain, and in particular to a powertrain having a selectable one-way clutch (SOWC) assembly for selecting between different operating states or modes.

BACKGROUND OF THE INVENTION

In various mechanical devices, and particularly within a transmission of an automotive powertrain, specialized over-running clutches or one-way clutches are used to produce a one-way driving connection between input and output members of the transmission. A one-way clutch typically has a pair of plates or races, and is capable of selectively transmitting torque between the races when the rotation of one race with respect to the other is in one direction, with the clutch "over-running" or freewheeling when the rotational direction is reversed.

The relative shape and/or orientation of the races may vary depending on the particular design of the one-way clutch. The mechanical means used to lock a typical one-way clutch are varied, but commonly consist of torque-transfer elements such as diodes, rollers, sprags, rockers, prawls, or struts that are positioned between the races. Depending on the particular type or style of one-way clutch and the direction of rotation, each race may include unique features such as wells or notches suitable for engaging one or more of the torque-transfer elements in order to selectively enable various clutch operating states or modes.

In a basic one-way clutch, the operating mode is determined by the direction of the torque being applied to an input race of the clutch. A selectable one-way clutch or a SOWC potentially provides additional utility relative to the conventional one-way clutch, with a SOWC being capable of producing a driving connection between the input and output races in one or both rotational directions. A SOWC can also freewheel in one or both rotational directions as needed. One of the two races of a conventional SOWC can be indexed or grounded to a stationary member, such as a transmission case or center support. However, the grounding of one race prevents such a SOWC from being used in applications where both races are allowed to rotate.

SUMMARY OF THE INVENTION

Accordingly, a SOWC assembly uses hydraulic-actuation to select a state or operating mode within a rotating housing. Unlike conventional SOWC designs, both races of the SOWC assembly can rotate at disparate speeds, i.e., one race is not grounded prior to actuation. Within the scope of the invention, the SOWC assembly has a pair of races keyed or splined to different housings and hubs. The housing and the hub can be attached to different elements of a gear train, for example, which can be rotating during the various gear states. A hydraulic actuator or actuators can be keyed or splined to the housing, with axial motion of the actuator or actuators selecting a state or operating mode of the SOWC assembly.

The SOWC assembly includes at least one rotatable selector plate positioned between the races, and having a plurality of radially-extending fingers. One or more actuators are splined to the housing and have a plurality of tabs each extending axially from the actuator toward the selector plate or plates. The tabs engage the fingers when the actuator is applied in a first axial direction, such that a rotation of the actuator or actuators moves the fingers from a first position to a second position to thereby rotate the selector plate or plates, and to thereby select one of the plurality of SOWC operating modes.

In one embodiment, the tabs each define an angled slot, with each finger continuously engaged with a different angled slot to move therewithin in response to a relative rotation between the selector plate and actuator. The selector plate can include a first and a second rotatable selector plate that are each selectively and independently moveable using different actuators to thereby establish at least three operating modes.

The above features and advantages, and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
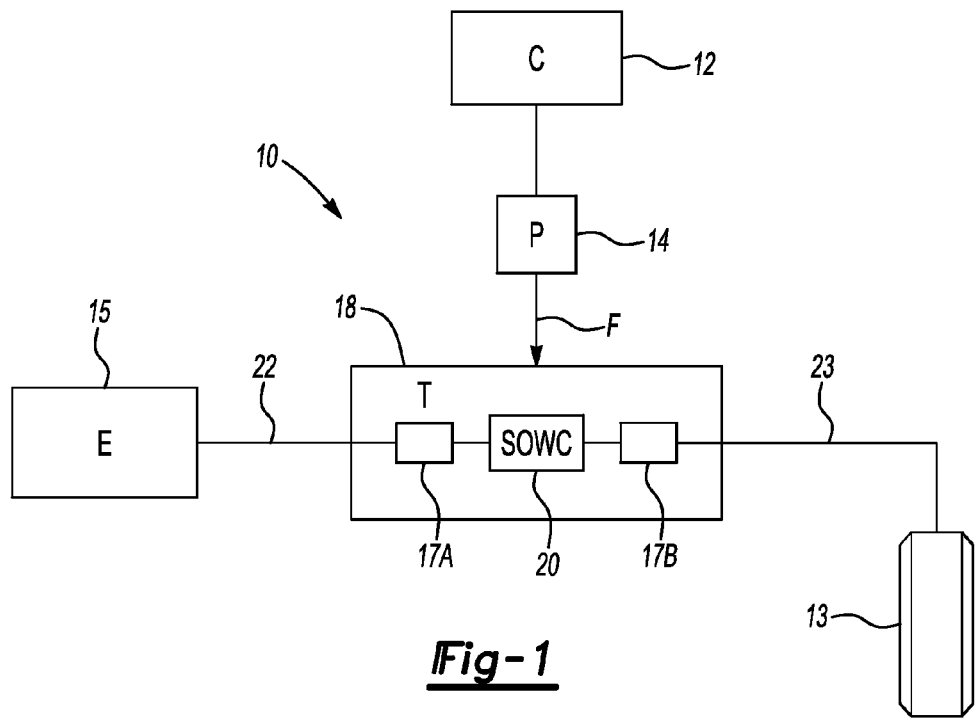
FIG. 1 is schematic illustration of a powertrain having a selectable one way clutch (SOWC) assembly in accordance with the invention.

With reference to the Figures, wherein like reference numerals refer to like or similar components throughout the several figures, and beginning with FIG. 1, a powertrain 10 includes an engine (E) 15, a hydraulic pump (P) 14, and a transmission (T) 18. The engine 15 can be configured as a gasoline, diesel, or alternate fuel internal combustion engine of the type known in the art. In place of the engine 15, or in conjunction therewith, an energy storage device such as a battery or battery pack can be used to supply energy to the transmission 18.

The transmission 18 includes a selectable one-way clutch (SOWC) assembly 20 and a plurality of rotary elements 17A, 17B, for example individual gear elements of one of more planetary gear sets (not shown), rotatable shafts, or other rotating transmission power transmitting member. The SOWC assembly 20 is operable for selectively establishing, transitioning, or shifting between different operating states or modes as set forth below, with the particular operating mode determined by an electronic control unit or controller (C) 12 in conjunction with an overall powertrain control algorithm or methodology. The controller 12 is in electrical communication with the pump 14 and any associated flow directional control valves, flow and/or pressure regulators, etc. (not shown) to provide precise fluid control within the powertrain 10.

The controller 12 can be configured as a distributed or central control module having such control modules and capabilities as might be necessary to operate the transmission 18 in the desired manner. For simplicity, the controller 12 is represented as a single device, although separate controllers may also be used within the scope of the invention depending on the number of additional functions which the controller 12 is intended to support or provide. The controller 12 can be configured as a general purpose digital computer generally comprising a microprocessor or central processing unit, read only memory (ROM), random access memory (RAM), electrically-programmable read only memory (EPROM), high speed clock, analog to digital (A/D) and digital to analog (D/A) circuitry, and input/output circuitry and devices (I/O), as well as appropriate signal conditioning and buffer circuitry. Each set of algorithms resident in the controller 12 can be stored in ROM and executed to provide the respective functions of each resident controller.

The transmission 18 can be either selectively or directly connected to the engine 15 via a first rotatable member 22, and is configured to transmit torque from the engine 15 through the element 17A, the SOWC assembly 20, and the element 17B to a second rotatable member 23. The second rotatable member 23 ultimately rotates a set of road wheels 13 to thereby propel any vehicle using the powertrain 10. As will be understood by those of ordinary skill in the art, any SOWC assembly, including the SOWC assembly 20 set forth herein, is designed to selectively hold torque in either, both, or neither rotational direction as needed to thereby establish or transition between different SOWC operating modes. In this manner the functionality of the transmission 18 can be optimized.

Figure 2:
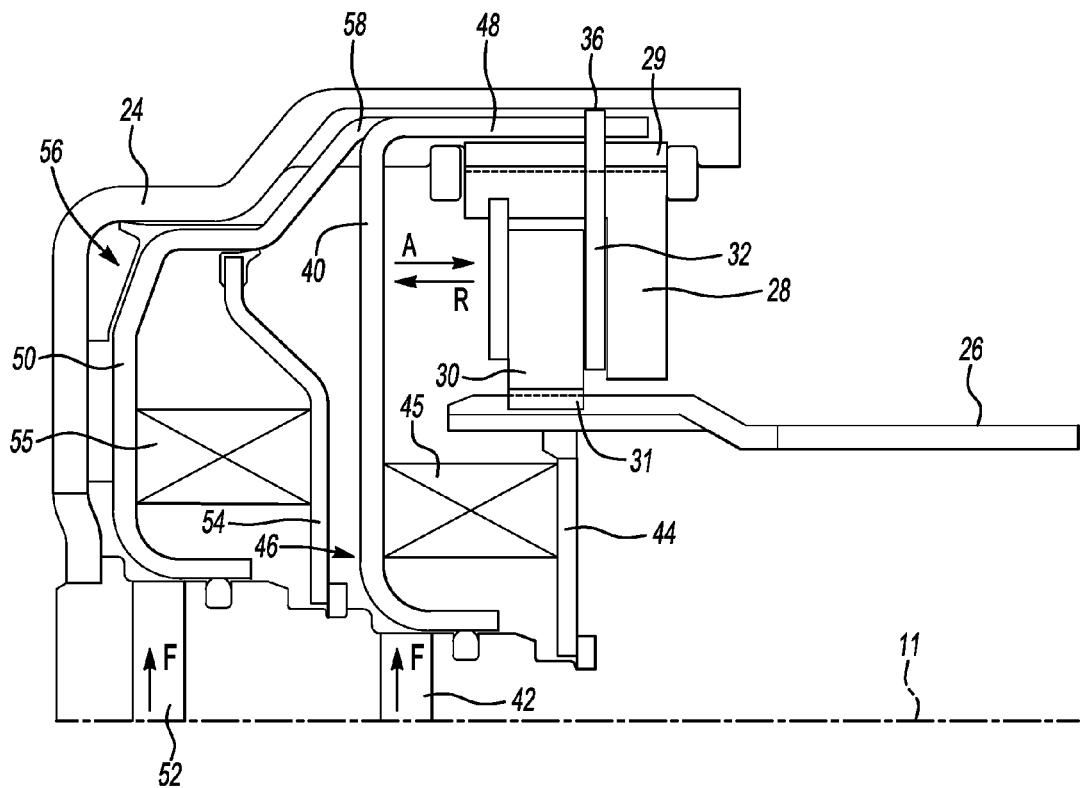
FIG. 2 is a schematic perspective side view of the SOWC assembly shown in FIG. 1.

Referring to FIG. 2, the SOWC assembly 20 of FIG. 1 is shown in partial schematic side view with respect to an axis of rotation or centerline 11 of the SOWC assembly 20. The SOWC assembly 20 includes a rotatable outer drum or housing 24, a rotatable inner hub 26, a rotatable first plate or race 28, and a rotatable second plate or race 30. The first race 28 is connected to the housing 24 via a set of mating splines 29, while the second race 30 is connected to the hub 26 via another set of mating splines 31. The SOWC assembly 20 also includes at least one rotatable selector plate 32 positioned between the first and second races 28 and 30, respectively.

A rotation of the selector plate 32 transitions or shifts the SOWC assembly 20 between a plurality of different SOWC operating states or modes. Directional toque transfer or holding can be provided in either direction across the SOWC assembly 20 as needed in order to establish such mode. Such torque transfer or holding can be achieved by selectively covering and uncovering different torque-transfer elements, e.g., diodes, struts, rollers, sprags, pawls, etc., thus allowing the torque-transfer elements to block or unblock rotation of one, both, or neither of the races 28 and/or 30 of the SOWC assembly 20 as needed, as determined by the controller 12. See for example the exemplary torque-transfer element 70 of FIG. 4.

To selectively actuate the SOWC assembly 20, a hydraulic actuator 40 is configured according to one embodiment as an annular, hydraulically-actuated piston mechanism. In this particular embodiment, the hydraulic actuator 40, which can be splined to the housing 24 as described below with reference to FIGS. 3 and 4 to rotate in conjunction therewith, can be selectively moved in the direction of arrow A in response to an admission of pressurized fluid (arrow F) from the pump 14 of FIG. 1, with the fluid (arrow F) flowing through a fluid channel 42 and into an apply chamber 46. When pressurized fluid is discontinued by the controller 12 of FIG. 1, a return device 45 such as a spring cage or other suitable return mechanism reacts against a stationary balance piston or reaction plate 44 to move the hydraulic actuator 40 back in the direction of arrow R.

Within the scope of the invention, a plurality of axially-extending prongs, projections, or actuator tabs 48 are operatively connected to or formed integrally with the hydraulic actuator 40, while a plurality of radially-extending pawls or fingers 36 are operatively connected to or formed integrally with a selector plate or plates 32. That is, the tabs 48 are adapted to continuously engage a different one of the fingers 36, with the rotation of the hydraulic actuator 40 when applied in the direction of arrow A or released in the direction of arrow R alternately moving the fingers 36 between a pair of positions in a discrete slot 72 (see FIG. 4). Movement of the fingers 36 within the discrete slot 72 of FIG. 4 exerts a force on the selector plate or plates 32 that is sufficient for rotating the selector plate 32, an action which selectively covers and uncovers different torque-transfer elements 70 (see FIG. 4) to thereby transition between the different available SOWC operating modes.

Still referring to FIG. 2, in another embodiment the SOWC assembly 20 includes an additional hydraulic actuator 50 that is positioned axially-outward of the hydraulic actuator 40 described above. As with the hydraulic actuator 40, the hydraulic actuator 50 is biased by a return device 55, which reacts against a balance piston or reaction plate 54. Admission of pressurized fluid (arrow F) through a fluid channel 52 and into an apply chamber 56 moves the hydraulic actuator 50 in the direction of arrow A to thereby apply the hydraulic actuator 40, while the return device 55 moves the hydraulic actuator 50 in the direction of arrow R to release the hydraulic actuator 50.

Similar to the configuration described above for the hydraulic actuator 40, a plurality of axially-extending prongs, projections, or actuator tabs 58 are operatively connected to or formed integrally with the hydraulic actuator 50. The tabs 58 are engageable with the fingers 36 of the selector plate or plates 32, i.e., with some predetermined number of the fingers 36 engaged with the tabs 58 of the hydraulic actuator 50 and the remainder of the fingers 36 engaged with the tabs 48 of the hydraulic actuator 40, as described above. Also within the scope of the invention, and as described below with reference to FIGS. 3 and 4, the selector plate 32 can be alternately configured as two independently-rotatable selector plates 32A and 32B, with each of the selector plates 32A and 32B of FIGS. 3 and 4 being separately rotatable using a respective or corresponding one of the hydraulic actuators 40 and 50. In this manner, additional operating modes are potentially enabled in the SOWC assembly 20.

Figure 3:
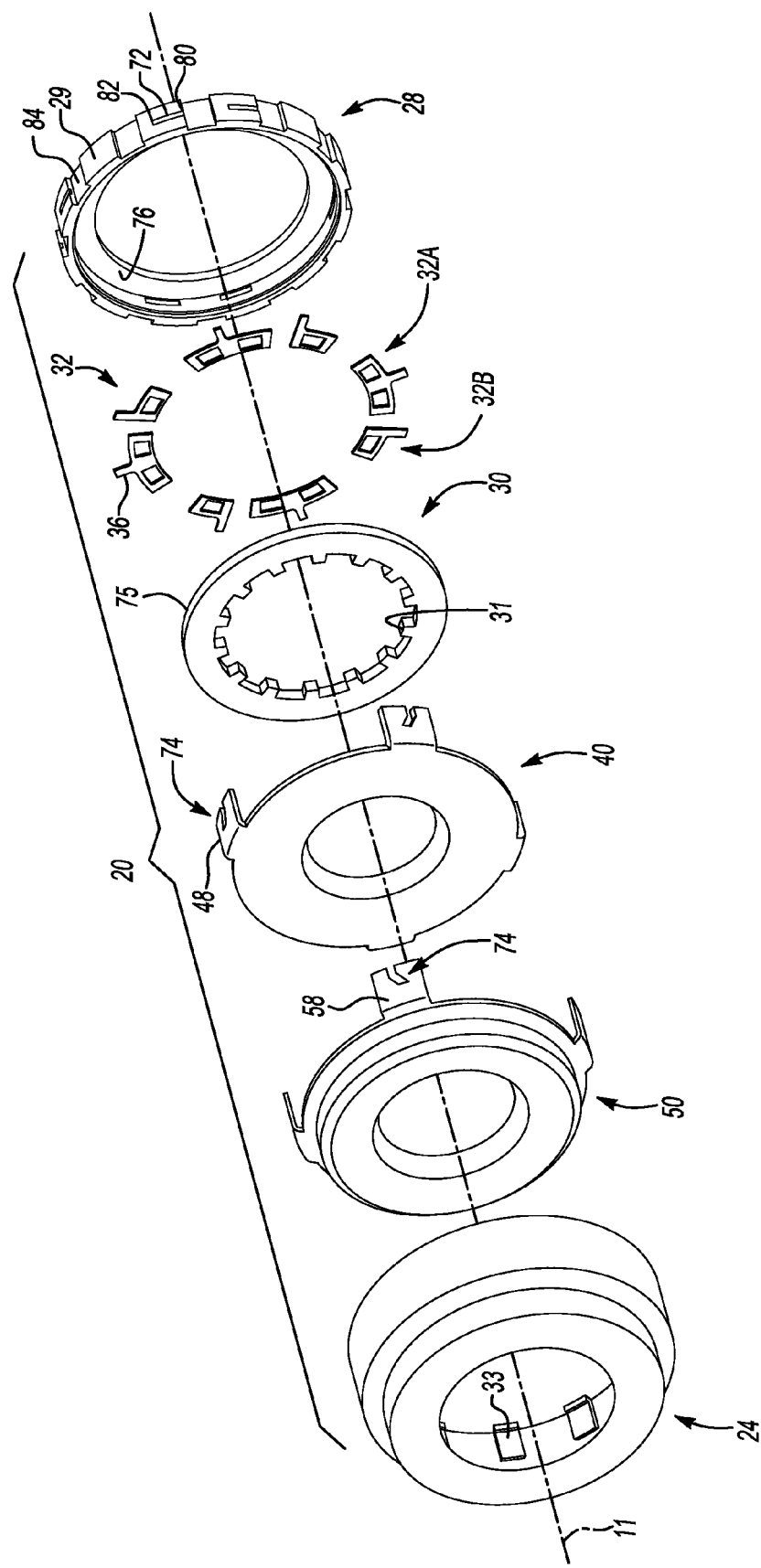
FIG. 3 is a schematic exploded view of the SOWC assembly of FIG. 2.
Figure 4:
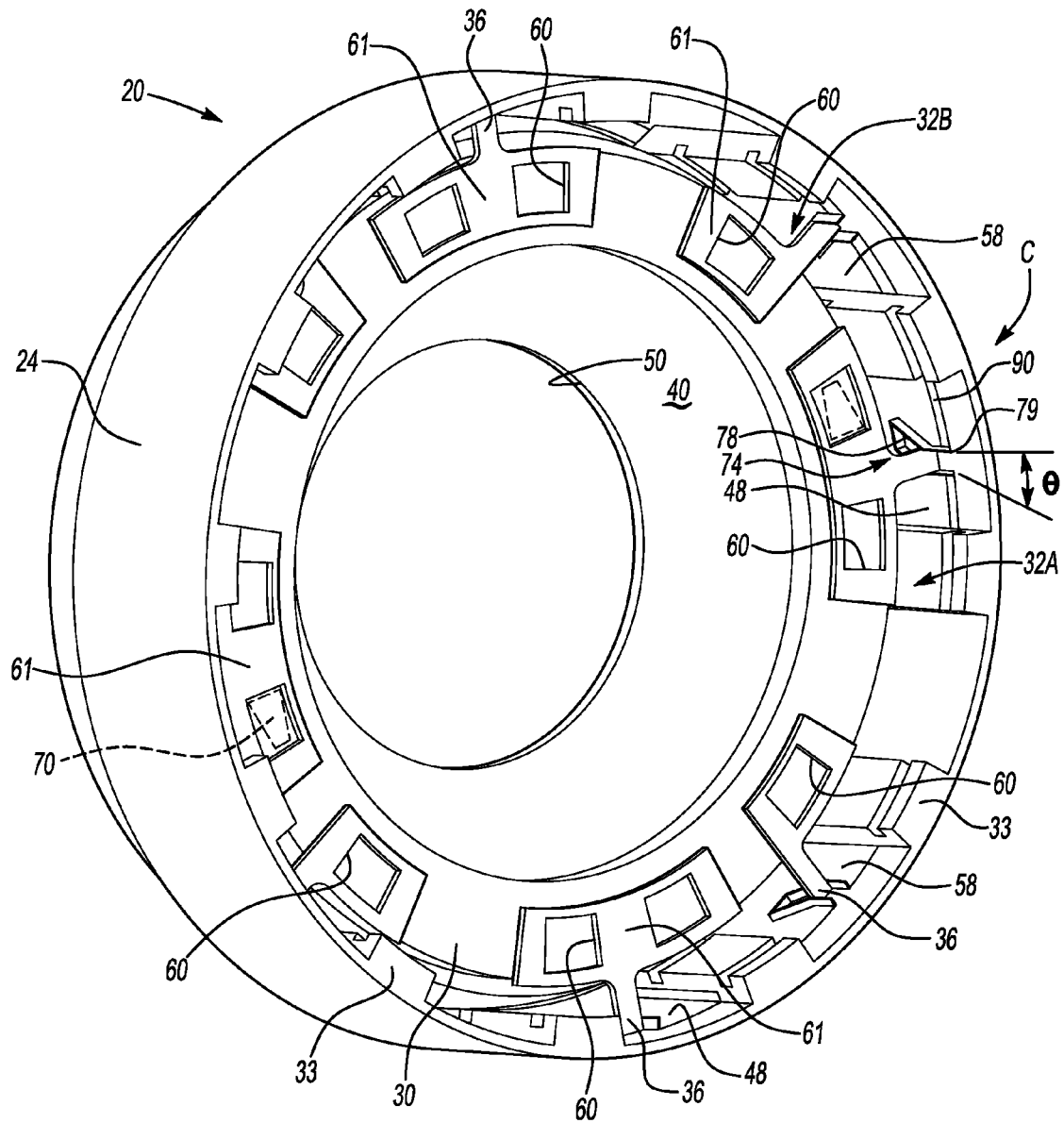
FIG. 4 is a schematic perspective side view of a portion of the SOWC assembly of FIGS. 2 and 3.

For example, the SOWC 20 can have two, three, or four states or operating modes. If only two operating modes are desired, only one actuation device is required, i.e., the hydraulic actuator 40 or 50. Such a two-mode device would have two sets of torque-transfer elements 70 (see FIG. 4), with one set functioning as a traditional or conventional one-way clutch and another set which can be selectively deactivated using the selector plate 32. Therefore, a two-mode SOWC device would be able to carry torque in both rotational directions simultaneously, or in one direction only while overrunning in the other rotational direction. Likewise, a three-mode or four-mode SOWC device can include two sets of torque-transfer elements 70 (see FIG. 4), both sets being controlled by separately or independently controlled selector plates 32A, 32B as shown in FIGS. 3 and 4. With independently-acting selector plates 32A, 32B, the SOWC assembly 20 of FIG. 2 can carry torque in both rotational directions, either rotational direction, or overrun in both rotational directions.

Referring to FIG. 3, an exploded view is provided of the SOWC assembly 20 of FIG. 2. As noted above, the SOWC assembly 20 includes the housing 24, the first race 28, and the second race 30, as well as one or both of the hydraulic actuators 40 and 50. The selector plate 32 can be alternately configured as a single selector plate for two-mode operation as set forth above, or as a set of independently-moveable selector plates 32A, 32B. The housing 24 has splines 33 that are engageable or mateable with the splines 29 of the first race 28, such that the housing 24 and first race 28 rotate in unison, while the second race 30 is connected to the hub 26 (see FIG. 2) via the splines 31, thereby rotating in conjunction with the hub 26.

The tabs 48, 58 of the respective hydraulic actuators 40, 50 are axially-projecting, i.e., the tabs 48, 58 extend in a direction substantially parallel to the centerline 11 of the SOWC assembly 20. In one embodiment, each tab 48, 58 defines an angled slot 74, with each of the fingers 36 of the selector plate 32 or plates 32A, 32B continuously engaged with a different one of the angled slots 74. Each finger 36 moves within a corresponding angled slot 74 during rotation of the hydraulic actuator 40 and/or 50, during either an application or a release thereof.

The first race 28 can be configured with the discrete slots 72 each having a pair of end positions 80, 82, with a number of discrete slots 72 equal to the number of fingers 36 of the selector plate 32 or plates 32A, 32B. Each adjacent pair of splines 29 of the first race 28 define a surface or groove 84 in which the tabs 48 can be positioned, thus effectively splining the hydraulic actuators 40, 50 to the first race 28 and the housing 24. Therefore, rotation of each of the hydraulic actuators 40, 50 can occur at a different rate than that of the second race 30.

Fingers 36 engaged with the tabs 48, 58 will therefore alternately move between the positions 80, 82 of the discrete slot 72 in the circumference of the first race 28 depending on the relative rotation of the races 28, 30. Torque-transfer elements 70 (see FIG. 4) disposed between the selector plate 32 and the second race 30 can be selectively covered or uncovered thereby as the selector plate 32 or plates 32A, 32B are rotated by the interaction or engagement of the tabs 48, 58 and the fingers 36. That is, rotation of the selector plate 32 or plates 32A, 32B can cover some number of the torque-transfer elements 70 of FIG. 4, depressing them into holes, notches, or wells (not shown) formed or otherwise provided in a surface 75 of the second race 30.

The same torque-transfer elements 70 can also be selectively uncovered, wherein a spring device (not shown) or other suitable biasing mechanism allows the torque-transfer elements 70 to at least partially enter a corresponding cavity (not shown) in a facing surface 76 of the first race 28. In this manner torque is held across the SOWC assembly 20 as needed, with the range of torque holding capability or number of different SOWC operating states or modes depending on the number of selector plates 32 and hydraulic actuators 40, 50 used, as well as the orientation and spacing of the torque-transfer elements 70, as will be understood by those of ordinary skill in the art.

Referring to FIG. 4, the SOWC assembly 20 of FIGS. 2 and 3 is shown with the first race 28 removed for clarity. In the embodiment of FIG. 4, the selector plates 32A, 32B are used in conjunction with hydraulic actuators 40 and 50, with only the hydraulic actuator 40 being visible from the perspective of FIG. 4. Each selector plate 32A, 32B has one or more windows 60 defined by adjacent blocking portions 61, such that rotation of the selector plates 32A, 32B selectively covers and uncovers a predetermined number of torque-transfer elements 70.

While only one torque-transfer element 70 is shown in FIG. 4 for simplicity, those of ordinary skill in the art will recognize that the actual number of torque-transfer elements 70 used in conjunction with the SOWC assembly 20, as well as spacing thereof, is dependent upon system design, backlash considerations, desired operating modes, etc. Generally, there will be one torque-transfer element 70 for each window 60. Likewise, for clarity the surface 75 of the second race 30 is shown without holes or wells for holding the torque-transfer elements 70, with such detail understood as being present within the scope of the invention and the understanding of the art of selectable one-way clutches.

Still referring to FIG. 4, and in particular the area generally indicated by the arrow C, each tab 48 can be configured to define an angled slot 74. The angled slot 74 can be shaped, sized, or otherwise configured to engage the fingers 36 of the selector plate 32 as described above. In one embodiment, the angled slot 74 can include a first slot portion 78 and a second slot portion 79. In the embodiment shown in FIG. 4, the second slot portion 79 is aligned in a substantially parallel manner with respect to the centerline 11 of the SOWC assembly 20, with the second slot portion 79 intersecting the first slot portion 78 at a predetermined angle ($\theta$). That is, the tab 48 has a distal end or outer wall 90, with the second slot portion 79 intersecting the outer wall in an orthogonal manner. The predetermined angle ($\theta$) can be selected as needed to provide a smooth engagement between each finger 36 and a mating angled slot 74. For example, a threshold range of approximately 30 to 50 degrees can be used according to one exemplary embodiment, although other ranges or angular values can also be used within the scope of the invention to provide the desired movement of the fingers 36 within a corresponding discrete slot 72 (see FIG. 3).

While the best modes for carrying out the invention have been described in detail, those familiar with the art to which this invention relates will recognize various alternative designs and embodiments for practicing the invention within the scope of the appended claims.

The invention claimed is:

1. A selectable one-way clutch (SOWC assembly) having a plurality of SOWC operating modes, the SOWC assembly comprising:
   a rotatable outer housing;
   a rotatable inner hub;
   a first race that is splined to said rotatable outer housing;
   a second race that is splined to said rotatable inner hub;
   at least one rotatable selector plate having a first plane positioned between said first race and said second race, said at least one selector plate having a plurality of fingers extending radially-outward along said first plane from said at least one selector plate;
   at least one actuator that is splined to said rotatable outer housing and having a plurality of tabs each perpendicular to said first plane and extending axially from said actuator toward said at least one selector plate, said tabs to engage a different one of said fingers when said actuator is applied in a first axial direction perpendicular to said first plane, such that actuation of said at least one actuator moves said fingers from a first position to a second position to thereby rotate said at least one selector plate and to thereby select one of the plurality of SOWC operating modes; and
   at least one return device moves said at least one actuator in a second axial direction, wherein a movement of said at least one actuator in said second axial direction moves said fingers from said second position to said first position to thereby select another one of the plurality of SOWC operating modes.

2. The SOWC assembly of claim 1, wherein said tabs each define an angled slot, and wherein each of said fingers is continuously engaged with a different said angled slot and moves therewithin in response to a relative rotation between said at least one rotatable selector plate and said at least one actuator.

3. The SOWC assembly of claim 1, wherein said at least one actuator is configured as a hydraulically-actuated piston.

4. The SOWC assembly of claim 1, wherein the plurality of SOWC operating modes includes: a first operating mode in which torque is held in one rotational direction, a second operating mode in which the SOWC assembly is locked in both rotational directions, and a third operating mode in which the SOWC assembly is allowed to freewheel in both rotational directions.

5. The SOWC assembly of claim 1, wherein said at least one rotatable selector plate includes a first and a second rotatable selector plate that are each selectively and independently moveable using said at least one actuator to thereby establish at least three operating modes as the plurality of SOWC operating modes.

6. The SOWC assembly of claim 5, wherein said at least one actuator device includes a first annular piston engages said first selector plate and a second annular piston engages the fingers of said second selector plate, and wherein said first and said second annular pistons are each selectively and independently engageable to thereby select between the plurality of SOWC operating modes.

7. An apparatus for selecting between at least two SOWC operating modes in a selectable one-way clutch (SOWC) assembly having an outer housing, the apparatus comprising:
a plurality of torque-transfer elements;
at least one rotatable selector plate having a first plane having a plurality of radially-extending fingers along said first plane, said at least one rotatable selector plate selectively covers and uncovers at least some of said plurality of torque-transfer elements to thereby hold torque across the SOWC assembly in a predetermined direction; and
at least one annular piston having a plurality of axially-extending tabs perpendicular to said first plane each defining an angled slot, wherein each of said axially-extending tabs is continuously engaged with a corresponding one of said plurality of radially-extending fingers along said angled slot;
wherein a movement of said at least one annular piston in a first axial direction moves a predetermined number of said fingers in one direction within said angled slot to thereby select a first SOWC operating mode, and wherein movement of said at least one annular piston in a second axial direction moves said fingers in another direction within said angled slot to thereby select a second SOWC operating mode.

8. The apparatus of claim 7, wherein said at least one selector plate includes a first selector plate and a second selector plate, and wherein said at least one annular piston includes a first annular piston and a second annular piston each engage with the fingers of a corresponding one of said first and said second selector plate.

9. The apparatus of claim 7, wherein each of said angled slots includes a first slot portion that is aligned substantially parallel to a centerline of the SOWC assembly, and a second slot portion intersecting said first slot portion at a predetermined angle.

10. The apparatus of claim 7, wherein the outer housing portion includes a plurality of internally-projecting splines, and wherein each of said plurality of axially-extending tabs are engageable with a corresponding one of said plurality of internally-projecting splines.

11. A transmission comprising:
first and second rotatable members;
a hydraulic pump operable for delivering a supply of pressurized fluid;
a selectable one way clutch SOWC assembly having a plurality of SOWC operating modes, said SOWC assembly including:
a plurality of torque-transfer elements;
an outer housing connected to said first rotatable member and having internally-projecting splines;
a first race splined to said outer housing;
a second race splined to a different member of the transmission and selectively rotatable with respect to said first race; and
at least one rotatable selector plate having a first plane having a plurality of radially-extending arms along said first plane, wherein a movement of said radially-extending arms rotates said at least one rotatable selector plate to thereby selectively cover and uncover a predetermined number of said torque-transfer elements, thereby holding torque in a predetermined direction across said SOWC assembly; and
at least one annular piston having a plurality of axially-extending tabs perpendicular to said first plane and each configured to engage and move a different one of said plurality of radially-extending arms;
and
a controller selectively moves said at least one annular piston in different axial directions to thereby move said plurality of radially-extending arms as needed to transition between said plurality of operating modes.

12. The transmission of claim 11, wherein said SOWC assembly is configured as one of: a roller-type device, a diode device, a sprag device, and a pawls device.

13. The transmission of claim 11, including a planetary gear set having a plurality of gear elements, wherein said first and said second rotatable members are operatively connected to different gear elements of said planetary gear set.

14. The transmission of claim 11, wherein said second race has an outer wall defining a plurality of slots for receiving a corresponding one of said radially-extending arms, and wherein each of said axially-extending tabs are positioned radially-outward of said outer wall.

15. The transmission of claim 14, wherein said axially-extending tabs define an angled slot to receive an end portion of said radially-extending arms, said angled slot being sufficiently shaped to allow said axially-extending tabs to move said radially-extending arms within said angled slots using a rotation of said at least one annular piston.

16. The transmission of claim 11, wherein said at least one rotatable selector plate includes a pair of selector plates each having a plurality of radially-extending arms, and wherein said at least one annular piston includes a pair of annular pistons each configured to engage a different one of said pair of selector plates.

* * * * *